United States Patent [19]

Carol, Jr. et al.

[11] 4,114,025
[45] Sep. 12, 1978

[54] MILEAGE INDICATOR

[75] Inventors: John A. Carol, Jr.; Harold P. McAlindon, both of Flint, Mich.

[73] Assignee: General Motors Corporation, Detroit, Mich.

[21] Appl. No.: 845,959

[22] Filed: Oct. 27, 1977

[51] Int. Cl.² ............................................. G01C 22/00
[52] U.S. Cl. ................................. 235/96; 116/114 W; 235/1 C; 235/125; 235/95 R
[58] Field of Search ................. 235/96, 95 R, 86, 125, 235/109, 117 A, 71 R, 103, 1 C, 103.5; 116/114 W

[56] References Cited

U.S. PATENT DOCUMENTS

| 3,583,629 | 6/1971 | Heidel | 235/96 |
| 3,880,351 | 4/1975 | Bogart | 235/96 |
| 3,935,996 | 2/1976 | Kleinbohl | 235/95 R |
| 3,965,847 | 6/1976 | Deming | 235/96 |

Primary Examiner—Stephen J. Tomsky
Attorney, Agent, or Firm—John P. Moran

[57] ABSTRACT

The drawings illustrate an odometer for vehicle use, including an idler wheel mounted adjacent the highest-order number wheel, and an endless strip of flexible material mounted around these wheels having a length equal to an integral multiple of the circumference of the highest-order number wheel. An array of indicia is formed on the strip for each rotation of the highest-order number wheel, and distinctly marked to portray, for example, that a second revolution of the highest-order number wheel is in progress.

2 Claims, 3 Drawing Figures

U.S. Patent        Sept. 12, 1978        4,114,025
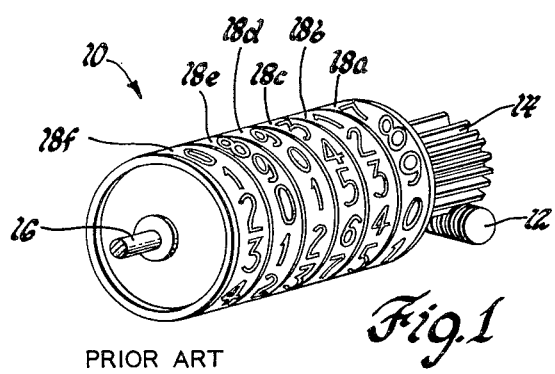
Fig.1
PRIOR ART
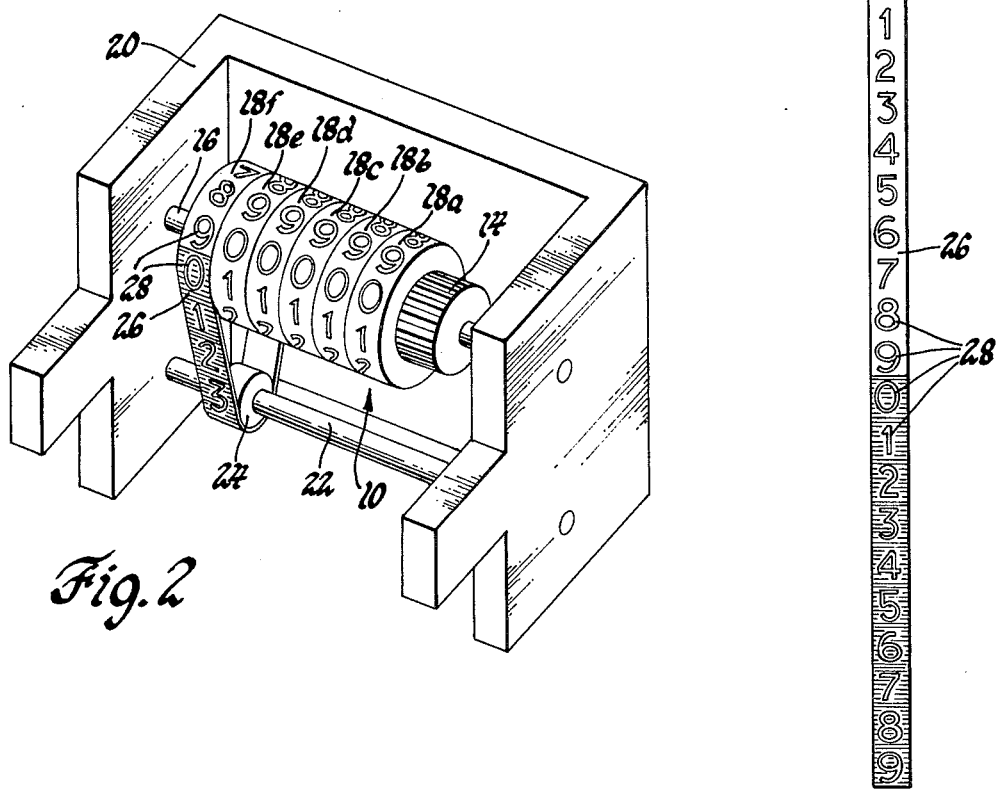
Fig.2
Fig.3

MILEAGE INDICATOR

This invention relates generally to vehicular odometers and, more particularly, to "telltale" odometers which indicate when the vehicle mileage exceeds 100,000 miles.

Heretofore, it has been possible for anyone desirous of tampering with an odometer to turn the odometer through the highest-order number wheel reading to recycle the odometer to a zero or other reading. Hence, the viewer would not be aware of the actual number of miles driven. It is desirable that odometers include means for indicating when they have turned through the highest possible reading, namely 99,999.9 miles. Prior art Heidel U.S. Pat. No. 3,583,629 and Bogart U.S. Pat. No. 3,949,201 have, respectively, disclosed the use of an additional wheel and a numeral obliterating mechanism for accomplishing this task.

An object of this invention is to provide an improved odometer including means for indicating when the vehicle mileage exceeds 100,000 miles.

Another object of the invention is to provide an odometer arrangement including the usual array of cylindrical coaxial number wheels interconnected to rotate stepwise in digital counting action and in sequence to indicate numerically the cumulative vehicle travel up to a predetermined total, say, 100,000 miles, one complete rotation of the highest-number wheel being indicative of the predetermined total, and, additionally, including an idler wheel rotatably mounted so as to have its axis parallel to the axis of the highest-order number wheel a predetermined distance apart therefrom and in a co-planar relationship therewith, an endless strip of flexible material mounted around the idler wheel and the highest-order number wheel for rotation with the latter, the endless strip having a length equal to twice the circumference of the highest-order number wheel, and an array of equally spaced numerical indicia formed on the endless strip indicative of twice the predetermined total and distinctly marked or color coded such that after one complete revolution of the highest-order number wheel the indicia portrays the fact that the second revolution of the highest-order number wheel is in progress.

These and other objects and advantages of the invention will become apparent when reference is made to the following description and accompanying drawings, wherein:

FIG. 1 is a perspective view of a prior art odometer arrangement;

FIG. 2 is a perspective view of an odometer arrangement embodying the invention; and FIG. 3 is a plan view of a portion of the FIG. 2 structure.

Referring now to the drawings in greater detail, FIG. 1 illustrates a conventional odometer 10 with the housing and certain parts removed. The odometer is typically driven through a worm gear 12 mounted on a vehicular speedometer shaft (not shown), and a drive gear 14 mounted on a shaft 16. A plurality of wheels 18a, 18b, 18c, 18d, 18e and 18f are mounted on the shaft 16, each having equidistant numerals from zero to nine formed on the outer surface thereof. When the wheel 18a, which is driven by the drive gear 14 and customarily indicates 1/10th units, has completed a complete revolution, suitable means, such as a small driving catch (not shown) rotates the adjacent units wheel 18b one place. This process is continued through the 10 units wheel 18c, 100 units wheel 18d, and 1000 units wheel 18e, until the highest-order number wheel 18f, indicative of 10,000 units, is advanced one place upon completion of a complete turn by the adjacent 1000 units wheel 18e.

FIG. 2 illustrates the odometer 10 of FIG. 1 mounted in a housing 20 suitable for mounting on the instrument panel (not shown) of the vehicle. A second shaft 22 is rotatably mounted in the housing 20 parallel to and a predetermined distance apart from the odometer shaft 16. An idler wheel 24 of a predetermined diameter smaller than the diameter of the highest-order number wheel 18f is mounted on the second shaft adjacent to and in a co-planar relationship with the highest-order number wheel 18f.

An endless belt or strip 26 of flexible material is mounted around the idler wheel 24 and the highest-order number wheel 18f for rotation with the latter. The endless strip 26 has a length equal to an integral multiple of the circumference of the highest-order number wheel 18f. The length preferably would be twice the circumference of the higher-order number wheel 18f. As indicated in FIG. 3, an array of spaced numerical indicia 28 is formed on the endless belt 26 for each rotation of the highest-order number wheel 18f, and distinctly marked for each complete revolution thereof. Thus, the indicia 28 would portray the fact that the second revolution of the highest-order number wheel 18f is in progress after that wheel completes its first revolution. If desired for more positive identification, the array of indicia 28 indicative of the second 100,000 revolution may be color coded differently from that of the array of indicia indicative of the first 100,000 revolution of the highest-order number wheel.

It is apparent that, with minor modifications, the idler wheel 24 and endless belt 26 could be associated with other number wheels, for example, the 1000 units wheel 18e, to indicate particular service intervals.

While but one embodiment of the invention has been shown and described, other modifications thereof are possible.

The embodiments of the invention in which an exclusive property or privilege is claimed are defined as follows:

1. In an odometer for vehicle use having an array of cylindrical coaxial number wheels interconnected to rotate stepwise in digital counting action and in sequence to indicate numerically the cumulative vehicle travel up to a predetermined total, one complete rotation of the highest-order number wheel being indicative of said predetermined total, the improvement comprising:

an idler wheel rotatably mounted so as to have its axis parallel to the axis of the highest-order number wheel a predetermined distance apart therefrom and in a co-planar relationship therewith, an endless strip of flexible material mounted around the idler wheel and the highest-order number wheel for rotation with the latter, the endless strip having a length equal to an integral multiple of the circumference of the highest-order number wheel, and an array of spaced numerical indicia formed thereon for each rotation of the highest-order number wheel and distinctly marked for each complete revolution of the highest-order number wheel so that the indicia portrays the fact that the particular revolution of the highest-order number wheel is in progress.

2. In an odometer for vehicle use having an array of cylindrical coaxial number wheels interconnected to rotate stepwise in digital counting action and in sequence to indicate numerically the cumulative vehicle travel up to a predetermined total, one complete rotation of the highest-order number wheel being indicative of said predetermined total, the improvement comprising:

an idler wheel rotatably mounted so as to have its axis parallel to the axis of the highest-order number wheel a predetermined distance apart therefrom and in a co-planar relationship therewith, and an endless strip of flexible material mounted around the idler wheel and the highest-order number wheel for rotation with the latter, the endless strip having a length equal to twice the circumference of the highest-order number wheel, and an array of equally spaced numerical indicia formed on the endless strip indicative of twice said predetermined total and color coded such that after one complete revolution of the highest-order number wheel the indicia portrays the fact that the second revolution of the highest-order number wheel is in progress.

* * * * *